INVENTOR.
CHARLES EDWARD BURRELL

By

OSTROLENK, FABER, GERB & SOFFEN
ATTORNEYS

United States Patent Office

3,333,048
Patented July 25, 1967

3,333,048
VERTICAL BUS ARRANGEMENT WITH SHIELDING MEANS TO PROTECT THE INSULATORS
Charles E. Burrell, Etobicoke, Ontario, Canada, assignor to I-T-E Circuit Breaker (Canada) Limited, Port Credit, Ontario, Canada, a limited-liability company
Filed June 11, 1965, Ser. No. 463,222
6 Claims. (Cl. 174—100)

ABSTRACT OF THE DISCLOSURE

A bus system insulator-supported in a vertical direction, including a plurality of spaced rings within each of which is located a plurality of insulators, one end of which is secured to the ring, the opposite end of which is connected to and supports the busbars. Shields are located above the insulator to protect same from falling debris.

---

The instant invention relates to insulator supported bus systems capable of transmitting current in a vertical direction, and in particular is directed to a novel structure which provides protection from falling debris for the insulators which support the conductors.

Prior art techniques for transmitting power in the vertical direction, for example to above ground switching stations from an underground generating station, generally use one of two techniques. The first contemplates the use of a plurality of cables extending vertically within the shaft leading from the underground generating area, and the second contemplates the use of an open bus system supported within the vertically extending shaft. The use of a plurality of cables, however, presents serious disadvantages; the first being the necessity of using extremely large diameter cables to provide the necessary current, and the second disadvantage flowing from the difficulty of spacing such cables from one another to provide minimum reactance. The open bus systems, wherein current carrying bus conductors are supported on insulators, eliminates the two disadvantages of the cable system, but has another serious disadvantage. Specifically, when the conductors are supported by a plurality of insulators, such insulators are exposed to falling debris which may accidentally drop into the vertical shaft in which the conductors are supported. It is highly likely that a falling object which strikes such insulators may crack and/or totally break the insulators, and thus adversely affect the spacing and supporting function which they perform.

In view of the above considerations, the instant invention contemplates that a plurality of current carrying bus conductors be supported within a vertically extending shaft by a plurality of spaced rings, each of which is secured to the shaft and has positioned therein a plurality of insulators which space and support the conductors. Further, the instant invention provides novel shielding structure above each of the insulators and thus prevents the possibility of falling debris from striking the insulators.

Accordingly it is an object of the instant invention to provide a bus system for transmitting current within a vertical shaft including a conductor, an insulator supporting the conductor within the shaft, and shielding structure located above the insulator for protecting the insulator from falling debris.

It is another object of the instant invention to provide a system for transmitting current from underground to above ground locations wherein a plurality of bus conductors are spaced and supported to give a low reactance, high current three-phase capability.

Still another object of the instant invention is to provide a bus system for transmitting current from underground locations which are simple in construction and of relatively low cost.

Other objects and a fuller understanding of the instant invention may be had by referring to the following specification and claims in which:

Figure 1:
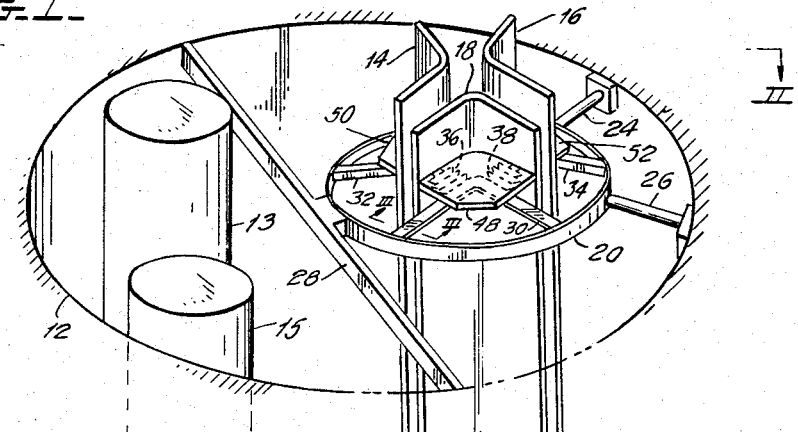
FIGURE 1 is a perspective view of the bus system of the instant invention shown extending within a vertical shaft.

Referring to FIGURE 1, there is shown a bus system indicated generally at 10 for transmitting current a vertical distance within the shaft 12. The bus system 10 is illustrated as a three phase system comprising V-shaped conductors 14, 16, and 18 each of which carries one phase of the three phase system. It is to be understood, however, that the instant invention would apply equally well to a system comprising more or less conductors carrying the same, more, or less phases of current. Also located within shaft 12 are two tubular conduits 13 and 15 which might be used to carry communications cables and/or to provide ventilation to the underground work area associated with the instant bus system.

Figure 3:
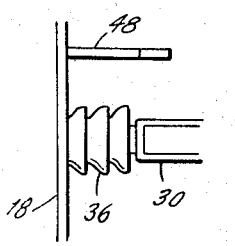
FIGURE 3 is a front view taken along the arrows III—III of FIGURE 1.
Figure 2:
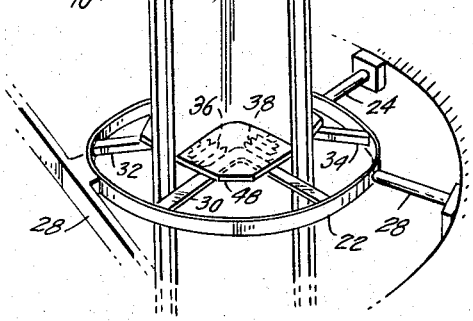
FIGURE 2 is a cross sectional view taken along the arrows II—II of FIGURE 1.
Figure 2:
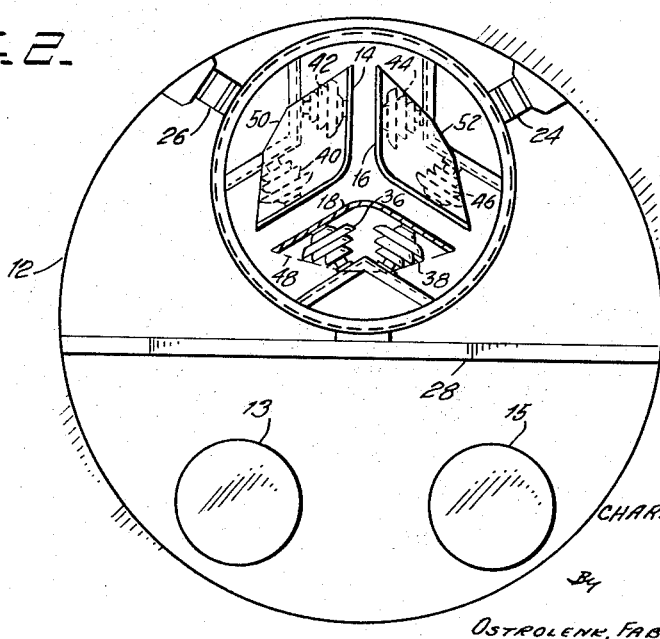

The conductors are supported within the shaft by a plurality of spaced rings 20, 22, (two being shown for the sake of clarity) each of which is supported within the shaft 12 by suitable bracing structure 24, 26, 28. In a preferred embodiment such rings are periodically spaced every five feet apart. Within the plane of each of the spaced rings are a plurality of angle-shaped support members 30, 32, 34, the sides of which extend parallel to the sides of the V-shaped conductors 14, 16, and 18. Each angle-shaped support member supports two insulators 36, 38; 40, 42; and 44, 46 (see FIGURE 2); the opposite ends of each pair of insulators supporting conductors 18, 14, and 16 respectively. Located above each pair of insulators is a shield 48, 50, 52 secured to the respective conductors 18, 14, and 16 (see FIGURE 3) which shields provide protection from falling debris for their respective pairs of insulators.

It will thus be seen that each pair of insulators is protected from falling objects, including liquids such as seaping water, solid articles such as dirt and rocks which may loosen from the sides of the shaft, and/or solid objects which may be inadvertently dropped into the shaft. This relatively simple low cost construction has proven highly successful in maintaining long life for the protected insulators.

Although we have described our invention with a certain degree of particularity, it is understood that the present disclosure has been made only by way of example and that numerous changes in the examples of construction and the combination arrangement of parts may be resorted to without departing from the sphere and scope of the invention as hereinafter claimed.

The embodiments of the invention in which an exclusive privilege or property is claimed are defined as follows:
1. A bus system for transmitting current through a vertically extending shaft, said bus system comprising:
   a vertically extending conductor located within the shaft;
   a ring secured to the shaft, said ring located in a plane transverse to the vertically extending axis of said conductor;
   an insulator located in said plane, one end of said insulator being supported by said ring, the opposite end of said insulator being connected to and supporting said conductor; and shielding means positioned above said insulator for protecting said insulator from falling debris.

2. A bus system for transmitting current through a vertically extending shaft, said bus system comprising:
a plurality of vertically extending conductors located within the shaft;
a plurality of rings secured to the shaft, each of said rings spaced from one another and located in planes which are transverse to the vertically extending axis of said conductors;
a plurality of insulators located in each of said planes, one end of each of said insulators being supported by its respective ring, the opposite end of each of said insulators being conducted to and supporting one of said conductors;
and shielding means positioned above each plurality of insulators for protecting said insulators from falling debris.

3. The bus system of claim 2 wherein each of said shielding means comprises a plurality of shielding members located in a plane which is parallel to the plane of their respective plurality of insulators.

4. The system of claim 3 wherein each of said shielding members is secured to one of said conductors.

5. A bus system for transmitting current through a vertically extending shaft, said bus system comprising:
a plurality of V-shaped conductors extending vertically within the shaft;
a plurality of rings secured to the shaft, each of said rings spaced from one another and located in planes which are transverse to the vertically extending axis of said conductors;
a plurality of insulators located in each of said planes, one end of each of said insulators being supported by its respective ring, the opposite end of pairs of adjacent ones of said insulators being connected to and supporting individual ones of said plurality of V-shaped conductors;
and shielding means located above each plurality of insulators, said shielding means comprising a plurality of shielding members each of which is secured to one of said conductors above respective pairs of adjacent ones of said insulators in a plane which is parallel to the plane of said plurality of rings;
said shielding members protecting their respective pairs of insulators from falling debris which might otherwise strike said insulators.

6. A bus system for transmitting current through a vertically extending shaft, said bus system comprising:
a plurality of V-shaped conductors extending vertically within the shaft;
a plurality of rings secured to the shaft, each of said rings spaced from one another and located in planes which are transverse to the vertically extending axis of said conductors;
a plurality of angle-shaped support members secured within each of said rings, the sides of said angle-shaped members extending parallel to the sides of said V-shaped conductors;
a plurality of pairs of insulators located in the plane of each ring, one end of each pair of insulators being connected to one of said angle-shaped support members, and the opposite end of each pair of insulators being connected to and supporting one of said conductors;
and a shielding member for each pair of insulators, said shielding member being secured to the conductor supported by said pair of insulators at a predetermined location above said pair of insulators, said shielding member protecting its respective pair of insulators from falling debris which might otherwise strike said pair of insulators.

References Cited

UNITED STATES PATENTS

| | | | |
|---|---|---|---|
| 1,072,525 | 9/1913 | Steinberger | 174—139 |
| 1,479,669 | 1/1924 | McClain | 174—139 |

LARAMIE E. ASKIN, *Primary Examiner.*